United States Patent
Chen et al.

(10) Patent No.: US 12,120,628 B2
(45) Date of Patent: Oct. 15, 2024

(54) USER EQUIPMENT GEOLOCATION USING A HISTORY OF NETWORK INFORMATION

(71) Applicant: AT&T Intellectual Property I, L.P., Atlanta, GA (US)

(72) Inventors: Jie Chen, Watchung, NJ (US); Wenjie Zhao, Princeton, NJ (US); Abraham George, Litchfield, CT (US); Ye Ge, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 291 days.

(21) Appl. No.: 17/409,246

(22) Filed: Aug. 23, 2021

(65) Prior Publication Data

US 2023/0054262 A1    Feb. 23, 2023

(51) Int. Cl.
| | |
|---|---|
| *H04W 64/00* | (2009.01) |
| *H04B 17/26* | (2015.01) |
| *H04B 17/345* | (2015.01) |
| *H04W 56/00* | (2009.01) |

(52) U.S. Cl.
CPC .......... *H04W 64/003* (2013.01); *H04B 17/26* (2015.01); *H04B 17/345* (2015.01); *H04W 56/0045* (2013.01)

(58) Field of Classification Search
CPC ...................... H04W 64/003; H04W 56/0045; H04B 17/26; H04B 17/345
See application file for complete search history.

(56) References Cited

U.S. PATENT DOCUMENTS

| 11,032,665 B1 | 6/2021 | George et al. | |
|---|---|---|---|
| 2002/0122406 A1* | 9/2002 | Chillariga | H04B 1/715 370/347 |
| 2009/0209271 A1* | 8/2009 | Reed | G01S 5/017 455/456.6 |
| 2010/0159957 A1* | 6/2010 | Dando | H04W 64/00 455/456.5 |
| 2015/0011235 A1* | 1/2015 | Agrawal | H04W 52/0261 455/456.1 |

(Continued)

OTHER PUBLICATIONS

Chen et al., "Spammer Location Detection," U.S. Appl. No. 17/409,456, filed Aug. 23, 2021, 44 pages.

*Primary Examiner* — Muthuswamy G Manoharan
(74) *Attorney, Agent, or Firm* — Guntin & Gust, PLC; John G. Rauch

(57) ABSTRACT

The described technology is generally directed towards user equipment (UE) geolocation using a long history of network information. In some examples, a long history of network information associated with a UE can be processed to identify frequently repeated serving cell and correlated timing advance values. The frequently repeated serving cell and correlated timing advance values are indicative of frequently visited places. Next, the long history can be leveraged to determine locations of the frequently visited places with enhanced accuracy, and the resulting enhanced accuracy locations can be identified in a location lookup table for the UE. When the UE subsequently connects to the frequently repeated serving cell and the correlated timing advance value is observed, the location lookup table can be used to quickly assign an enhanced accuracy location to the UE.

20 Claims, 10 Drawing Sheets

(56) References Cited

U.S. PATENT DOCUMENTS

| | | | |
|---|---|---|---|
| 2015/0045061 A1* | 2/2015 | Da | H04W 4/023 |
| | | | 455/456.2 |
| 2019/0319868 A1* | 10/2019 | Svennebring | H04L 41/147 |
| 2021/0204116 A1* | 7/2021 | Naujok | H04W 12/68 |

* cited by examiner

USER EQUIPMENT GEOLOCATION USING A HISTORY OF NETWORK INFORMATION

TECHNICAL FIELD

The subject application is related to geolocation of user equipment in cellular communication systems using a history of network information, e.g., geolocation of user equipment that communicates via fourth generation (4G), fifth generation (5G), and/or subsequent generation cellular networks.

BACKGROUND

User equipment (UE) geolocation is a key enabler for radio access network (RAN) optimization and network planning. Most existing UE geolocation algorithms are based on wireless network measurements collected from cells instantly or in a very short time window, e.g., over several minutes. It is challenging to estimate UE locations accurately with a limited quantity of network measurements, especially for stationary UEs.

Example UE location estimation techniques include triangulation, in which measurements from multiple cells are utilized. However, triangulation is impossible when there too few measurements from which distance to neighbor cells can be inferred, as is often the case for stationary UEs.

Another example UE location estimation technique is arc intersection. During a UE handoff event, there may be two measurements of timing advance, corresponding to the origin and destination cells, which are reported within a few seconds. The position of a UE can be calculated as an intersection of two arcs defined by the location of non co-located origin and destination cells and the distance of the UE from these cells. However, stationary UEs rarely experience a handover event during an active session.

Machine learning (ML) models can also be used for UE location estimation. ML models can be trained with observed UE locations and corresponding serving cell, timing advance and radio frequency (RF) information. Fingerprints can then be derived and used to locate UEs. However, ML methods suffer from sample bias which can skew location estimations towards locations in which numerous UEs are observable.

The difficulties of existing geolocation methods leads to a large variance in location estimation accuracy, which can in turn lead to suboptimal network planning and correspondingly poor cellular service in certain areas.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
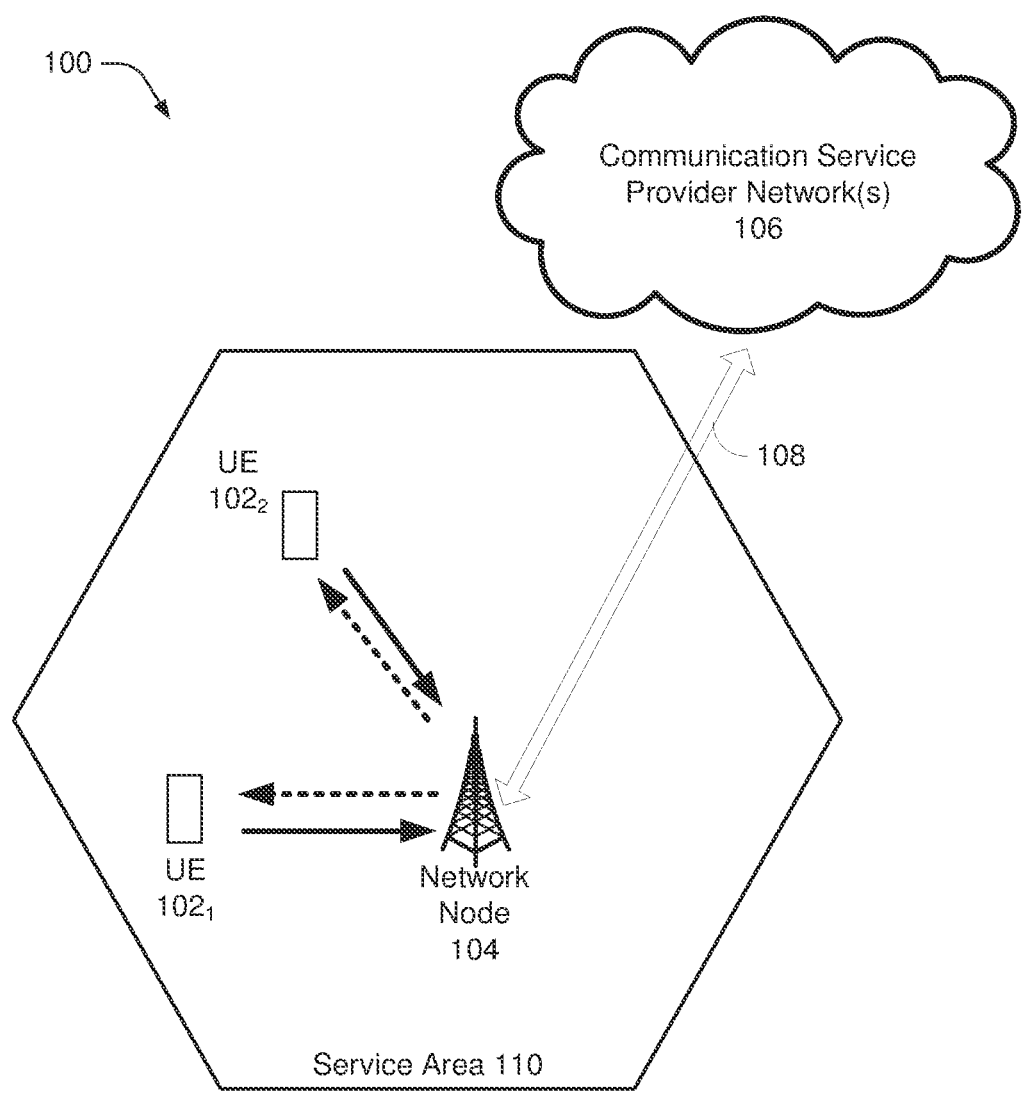
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards UE geolocation using a long history of network information. In some examples, a long history of network information associated with a UE can be processed to identify frequently repeated serving cell and correlated timing advance values. The frequently repeated serving cell and correlated timing advance values are indicative of frequently visited places. Next, the long history can be leveraged to determine locations of the frequently visited places with enhanced accuracy, and the resulting enhanced accuracy locations can be identified in a location lookup table for the UE. When the UE subsequently connects to the frequently repeated serving cell and the correlated timing advance value is observed, the location lookup table can be used to quickly assign an enhanced accuracy location to the UE.

This disclosure appreciates that UEs may often be stationary and, when stationary, UEs may connect to a single serving cell or co-located serving cells. The majority of mobile traffic arises from UEs that are indoor and stationary and so it is critical to address such scenarios to perform UE geolocation effectively.

Most existing geolocation methods disregard specific individual user patterns. It is not uncommon for an individual user to follow very similar routines and be served by the same set of cells repeatedly, day after day. For example, people may stay at a same workplace in the daytime and get back home in the evening during work days. People have their own favorite places (stores, restaurants, etc.) that they may often visit.

When an individual is more or less stationary in a single location, his/her UE is usually served by a limited number of cells nearby. The distances from the UE to this limited set of cells are static. Instead of relying on network measurements collected over a narrow time period to estimate such static UE locations, this disclosure proposes methods to identify whether a live session UE is located at one of its frequently visited places, which can be learned offline using historical data collected over a long time period of, e.g., a week or longer. Some long histories can include up to several months of network information or more.

This disclosure targets stationary UE sessions that contribute to the majority of network traffic. These tend to have poor geolocation accuracy from existing geolocation algorithms due to lean reported measurement information, often from single serving cells without neighbor cell references. This disclosure utilizes a long time history of network information to aggregate measurements collected while a UE is at a same location at different points in time, to enhance the information extracted and improve geolocation accuracy. Embodiments of this disclosure can also improve location estimation accuracy of moving UE sessions in scenarios wherein UEs are on their ordinary routes. By aggregating measurements, location can be estimated by selecting most reliable arc intersects from different neighbor cells and observed timing advance values, instead of using instant measurements. Lookup tables can be generated and used for pattern matching at an individual UE level.

This disclosure furthermore includes a UE pattern matching process to soft-match a pattern to a location, using an interval buffer around the relevant measurement. The pattern matching process can use partial measurement records collected passively from network nodes and simple key performance indicators (KPIs), without requiring significant power/resource consumption. The pattern matching process uses serving cell information such as serving cell position and azimuth, as well as timing advance information, which is easily obtained. The pattern matching process can be used at scale and can be easily merged with existing geolocation processes.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 1021, 1022, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IoT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
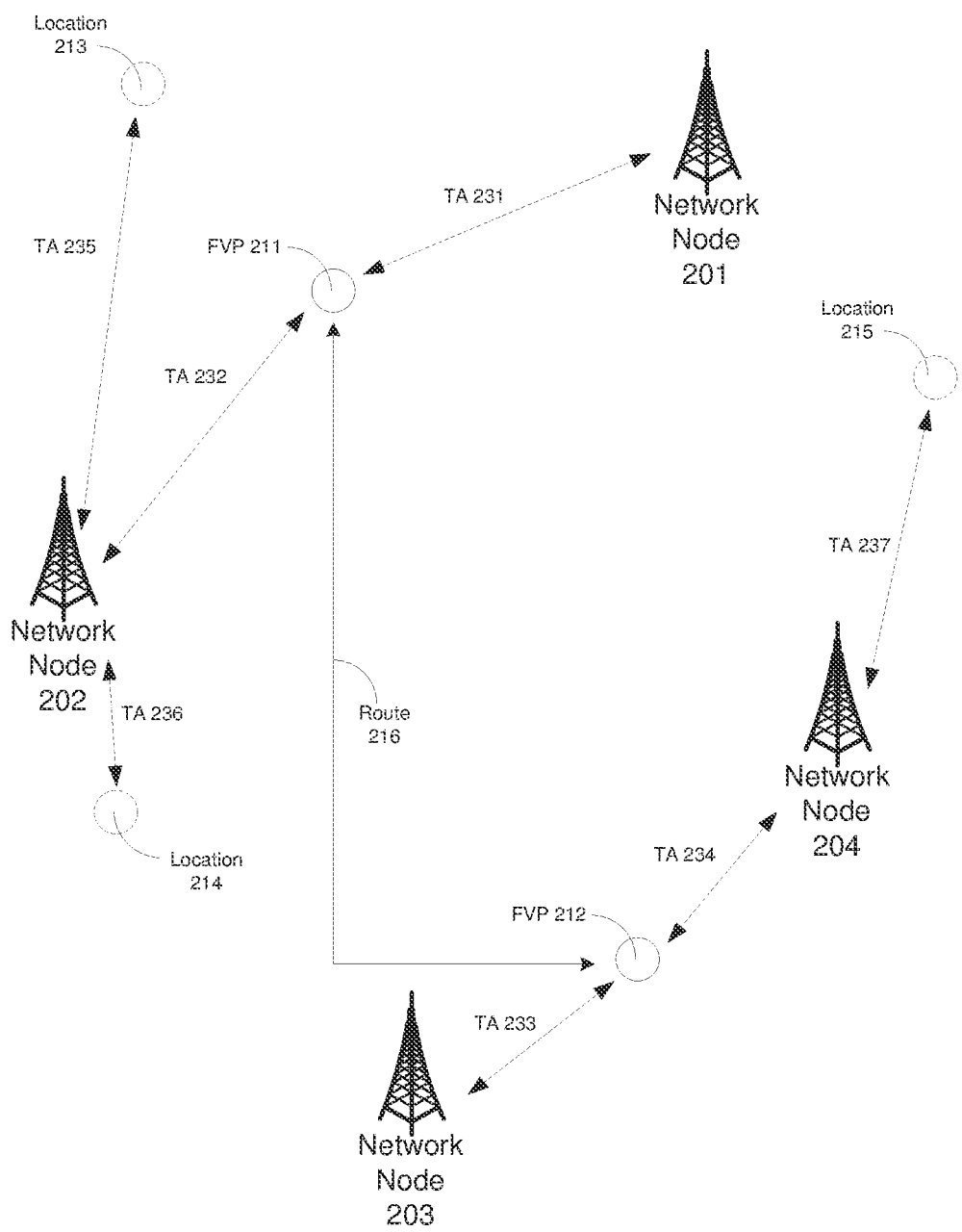
FIG. 2 illustrates example network nodes and various example locations of a UE in a geographical area, in accordance with various aspects and embodiments of the subject disclosure.

FIG. 2 illustrates example network nodes and various example locations of a UE in a geographical area, in accordance with various aspects and embodiments of the subject disclosure. FIG. 2 comprises network nodes 201, 202, 203, and 204, distributed in a geographical area comprising the network nodes 201, 202, 203, and 204. FIG. 2 furthermore illustrates various locations visited by an example UE (the example UE itself is not included in FIG. 2 for simplicity of the illustration). The locations include two example frequently visited places, FVP 211 and FVP 212. The locations further include various other locations 213, 214, and 215, which were visited by the UE, however locations 213, 214, and 215 were not visited with sufficient frequency to consider locations 213, 214, and 215 to be frequently visited places. A frequent travel route 216 illustrates the UE's frequently used travel path between FVP 211 and FVP 212.

FIG. 2 also illustrates, via dotted arrows, which of the network nodes 201, 202, 203, or 204 served the UE when the UE visited the various different locations 211-215, along with example timing advances TA 231, TA 232, TA 233, TA 234, TA 235, TA 236, and TA 237, which represent timing advance measurements associated with the UE while at the various different locations 211-215. For example, when the UE visited location 213, it was served by a serving cell at network node 202 and reported a timing advance TA 235. When the UE visited location 214, it was served by a serving cell at network node 202 and reported a timing advance TA 236. When the UE visited location 215, it was served by a serving cell at network node 204 and reported a timing advance TA 237. Serving cell and corresponding timing advance information for the UE, as well as corresponding time stamp information, can be logged in a long history of network information for the UE as described herein.

The UE visited FVP 211 and FVP 212 multiple times. On some of the occasions when the UE visited FVP 211, it was served by a serving cell at network node 201, and reported a timing advance TA 231. On other occasions when the UE visited FVP 211, it was served by a serving cell at network node 202, and reported a timing advance TA 232. Similarly, on some of the occasions when the UE visited FVP 212, it was served by a serving cell at network node 203, and reported a timing advance TA 233. On other occasions when the UE visited FVP 212, it was served by a serving cell at network node 204, and reported a timing advance TA 234. Therefore, a long history of network information for the UE can include multiple different serving cell and corresponding timing advance entries, corresponding to different times the UE visited a location such as FVP 211 and FVP 212.

In a scenario such as illustrated in FIG. 2, network equipment coupled with network nodes 201-204, such as network equipment of the communication service provider network(s) 106 illustrated in FIG. 1, does not necessarily have access to accurate location information corresponding to locations 211-215. Instead, the network equipment may have limited information, such as serving cell information and timing advance information, from which the locations 211-215 can be derived with some degree of accuracy. When the only available information is a single serving cell and a corresponding timing advance measurement, location estimation accuracy can be limited to candidate locations on a circle surrounding the serving cell node, with a radius defined by the timing advance. Such a limited accuracy is generally undesirable and can be improved upon by embodiments of this disclosure.

By collecting a long history of network information, e.g., over weeks or months, techniques according to this disclosure can more accurately estimate locations of FVPs 211, 212. A long history can include network information reflecting a UE's occasional use of different serving cells, e.g., a serving cell at network node 201 and a serving cell at network node 202, while the UE is at a same FVP, such as FVP 211. Such network information from multiple serving cells can be leveraged to determine the location of the FVP 211 more accurately, as described herein. Embodiments can build a location lookup table or other data structure including enhanced accuracy FVP locations and corresponding serving cell and timing advance information. Subsequently, the location lookup table can be used to quickly determine UE locations whenever the UE connects to a serving cell in the location lookup table and reports a timing advance in the location lookup table.

In some embodiments, the techniques described herein can be extended to locate a UE when it is traveling on a route 216, either by applying the same techniques as used for FVPs 211, 212 in connection with route 216, or by leveraging the enhanced accuracy estimation of FVPs 211, 212 to generate an enhanced accuracy estimation of the route 216.

Figure 3:
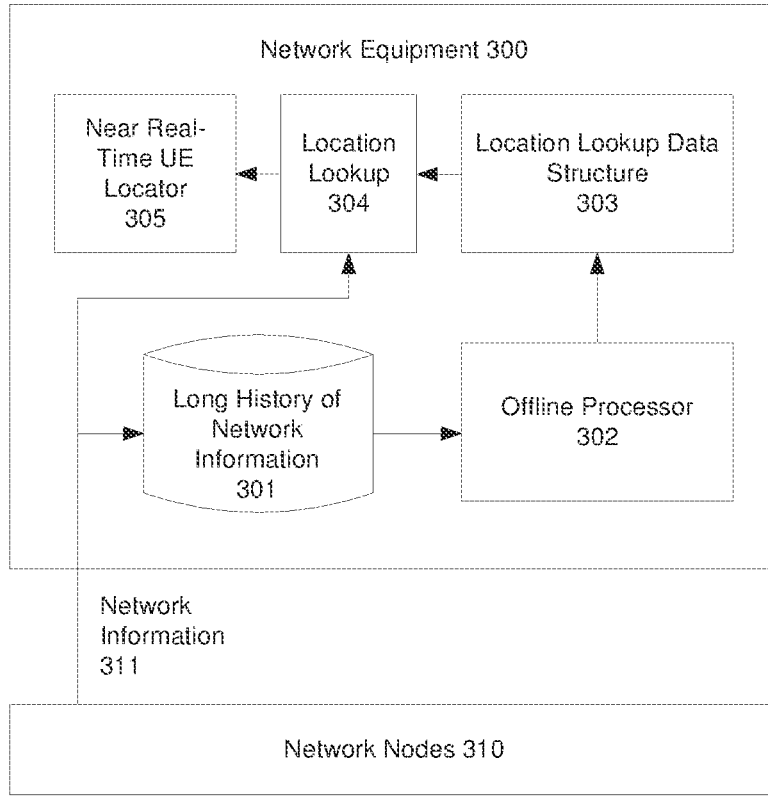
FIG. 3 illustrates example network equipment configured to perform user equipment geolocation using a long history of network information, in accordance with various aspects and embodiments of the subject disclosure.

FIG. 3 illustrates example network equipment configured to perform user equipment geolocation using a long history of network information, in accordance with various aspects and embodiments of the subject disclosure. FIG. 3 comprises network equipment 300 and network nodes 310. The network equipment 300 includes a long history of network information 301, an offline processor 302, a location lookup data structure 303, a location lookup 304, and a near real-time locator 305. The network equipment 300 can receive network information 311 from network nodes 310. The network information 311 can be stored in the long history of network information 301. The received network information 311 can also be used by location lookup 304.

The example network equipment 300 can be located, e.g., in the communication service provider network(s) 106 illustrated in FIG. 1. The network nodes 310 can comprise, e.g., network nodes such as 201, 202, 203 and 204, illustrated in FIG. 2. The network nodes 310 can be configured to report network information 311 to the network equipment 300, wherein the network information 311 can include serving cell identifications, timing advance information, and time stamp information, indicating serving cells used by a UE, corresponding timing advance information, and corresponding time stamp information, as can be understood with reference to FIG. 2.

In FIG. 3, the long history of network information 301 can store network information 311 over a long period, e.g., one week or longer. In some embodiments, the long history of network information 301 can store up to one, two, or three months of network information 311, or more. An example of long history of network information 301 is provided in FIG. 4.

Figure 4:
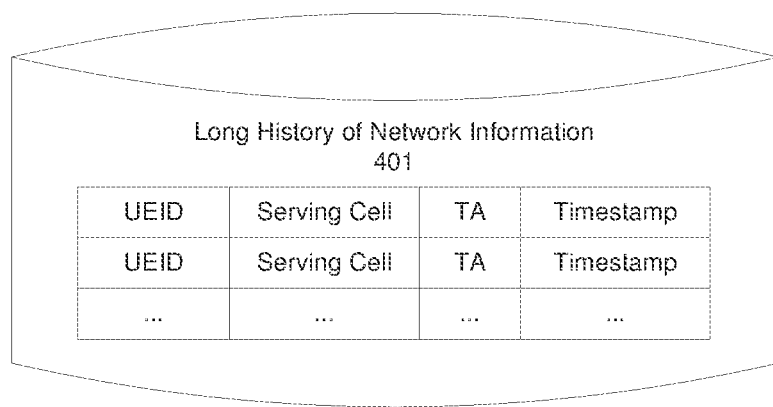
FIG. 4 illustrates an example long history of network information, in accordance with various aspects and embodiments of the subject disclosure.

FIG. 4 illustrates an example long history of network information, in accordance with various aspects and embodiments of the subject disclosure. The example long history of network information 401 can implement, e.g., the long history of network information 301 introduced in FIG. 3. The long history of network information 401 can include a table or other data structure comprising user equipment identifiers (UEIDs), serving cell information, timing advance (TA) information, and timestamps. In FIG. 4, each row of the table identifies a serving cell and correlated TA, for a UE identified by a UEID, at a time indicated by the timestamp.

Figure 5:
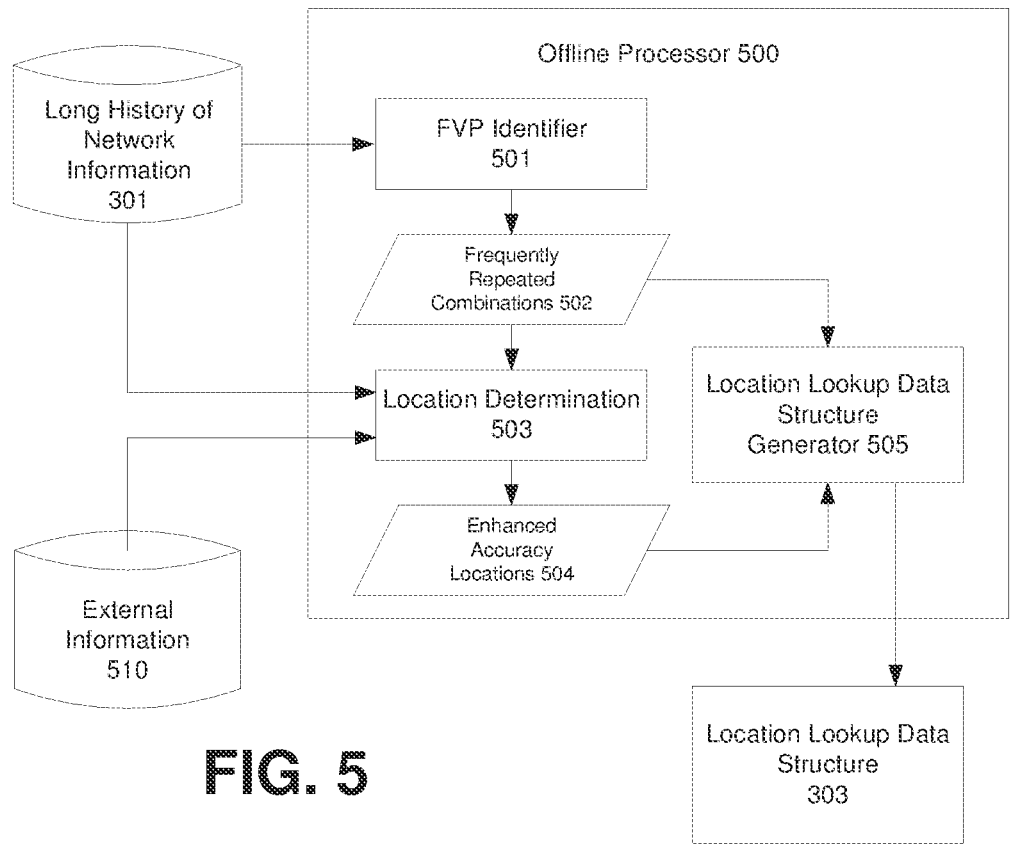
FIG. 5 illustrates an example offline processor configured to use a long history of network information to generate a location lookup data structure, in accordance with various aspects and embodiments of the subject disclosure.

Returning to FIG. 3, the offline processor 302 can process the long history of network information 301 to identify frequently repeated serving cell and timing advance information therein. FIG. 5 describes an example offline processor in further detail. In general, offline processor 302 can apply a frequency criterion which defines a frequency needed to qualify as frequently repeated. After identifying frequently repeated serving cell and timing advance information, the offline processor 302 can proceed to determine locations associated with the frequently repeated serving cell and timing advance information. The offline processor 302 can optionally use any location processing techniques, and this disclosure provides an example arc intersection technique that can be used for location processing in some embodiments.

Figure 6:
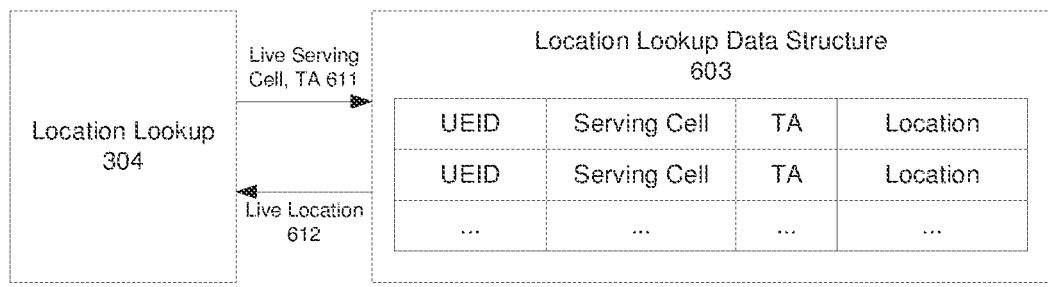
FIG. 6 illustrates an example location lookup data structure and use thereof, in accordance with various aspects and embodiments of the subject disclosure.

The offline processor 302 can generate location lookup data structure 303, which can include determined locations of FVPs, along with associated frequently repeated serving cell and timing advance information. FIG. 6 describes an example location lookup data structure in further detail. The location lookup data structure 303 can be used for any purpose and this disclosure is not limited to any particular use of the location lookup data structure 303. In some embodiments, the location lookup data structure 303 can be used for live location estimation of UEs, e.g., for real-time or near real-time location estimation, through the use of location lookup 304 and near real-time UE locator 305.

Location lookup 304 can be configured to receive network information 311 in near real-time, as it arrives at network equipment 300. Location lookup 304 can extract serving cell and timing advance information from network information 311, and location lookup 304 can lookup extracted serving cell and timing advance information in the location lookup data structure 303. In response to identifying substantially matching serving cell and timing advance information in the location lookup data structure 303, location lookup 304 can obtain the corresponding location information from the location lookup data structure 303. Location lookup 304 can optionally provide the extracted serving cell and timing advance information, the substantially matching serving cell and timing advance information, and/or the corresponding location to the near real-time UE locator 305.

The near real-time UE locator 305 can optionally apply further location processing techniques to refine and/or confirm the location identified by the location lookup 304. The near real-time UE locator 305 can receive the extracted serving cell and timing advance information, the substantially matching serving cell and timing advance information, and/or the corresponding location from the location lookup 304, and the near real-time UE locator 305 can optionally apply further location processing to generate and/or output UE location information to any consuming process or data store.

In an example approach according to FIG. 3, a first phase can include location lookup data structure 303 generation, by offline processor 302, for each UE based on historical measurement data recorded in the long history of network information 303. The first phase can include FVP measurement pattern (UE, cell, TA) extraction, in which frequently observed serving cells and corresponding timing advance/ RF values are identified. The first phase can further include neighbor identification, in which neighbor cells and neighbor TAs of each FVP measurement pattern are identified in order to produce a set of paired measurements comprising, e.g., (UE, cell, TA, cell neighbor, TA neighbor) per each FVP. Next, the first phase can apply an arc intersection algorithm on paired measurements with cell information (cell, latitude, longitude, azimuth) to estimate a set of FVP candidate locations for each UE. Next, the first phase can cross validate the estimated locations' distance and azimuth gap to any other cells observed for the UE, and pick the most reliable location estimates for each FVP measurement pattern [UE, cell, TA]. Finally, the first phase can combine the FVP measurement pattern with estimated FVP location as FVP lookup=a set of (UE, cell, TA, location) for each UE.

A second phase can include online real-time geolocation. The second phase can include checking if a UE observed serving cell and TA value, plus or minus a delta to account for noise, matches with a (cell, TA) pair from UE's FVP lookup keys. If yes, a corresponding FVP location can be used as a location estimate.

FIG. 5 illustrates an example offline processor configured to use a long history of network information to generate a location lookup data structure, in accordance with various aspects and embodiments of the subject disclosure. FIG. 5 includes the example offline processor 500, as well as the long history of network information 301 and the location lookup data structure 303 introduced in FIG. 3, and external information 510 which can optionally be consumed by the offline processor 500. The example offline processor 500 can implement the offline processor 302 introduced in FIG. 3.

The example offline processor 500 includes FVP identifier 501, frequently repeated combinations 502, location determination 503, enhanced accuracy locations 504, and location lookup data structure generator 505. In an example operation of the offline processor 500 the FVP identifier 501 can process long history of network information 301 to identify frequently repeated combinations 502. The frequently repeated combinations 502 can include, e.g., serving cell and timing advance information that is repeated with sufficient frequency to meet a frequency criterion.

Subsequent to identifying frequently repeated combinations 502, location determination 503 can determine enhanced accuracy locations 504, for example by determining an enhanced accuracy location for each of the frequently repeated combinations 502. Location determination 503 can use the frequently repeated combinations 502, information in the long history of network information 301, and/or external information 510 to determine enhanced accuracy locations 504. In some embodiments, location determination 503 can apply the arc intersection techniques disclosed herein to determine enhanced accuracy locations 504.

In an embodiment, useful information in the long history of network information 301 includes supplemental serving cell and timing advance information, such as, referring to FIG. 2, an identification of a serving cell at network node 202 and timing advance information TA 232, which can supplement an identification of a serving cell at network node 201 and timing advance information TA 231 to assist with accurately estimating FVP 211. Location determination 503 can process such information in connection with determining locations.

In another embodiment, useful information in the external information 510 can include, e.g., geographic information such as locations of roads and buildings, which can indicate probable locations of UEs served by a given serving cell and having a given timing advance. Location determination 503 can process such information in connection with determining locations.

Location lookup data structure generator 505 can be configured to generate or update location lookup data structure 303, by including therein the frequently repeated combinations 502 and correlated enhanced accuracy locations 504. FIG. 6 illustrates an example location lookup data structure.

FIG. 6 illustrates an example location lookup data structure and use thereof, in accordance with various aspects and embodiments of the subject disclosure. The example location lookup data structure 603 can implement the location lookup data structure 303 introduced in FIG. 3. Location lookup data structure 603 can be in the form of a table with rows comprising a UEID, an identification of a serving cell, an identification of a TA, and a location. In another embodiment, the location lookup data structure 603 can be for a single UEID, in which case the location lookup data structure 603 need not include a column for UEID.

In the location lookup data structure 603, each row comprises a correlated UEID, serving cell, TA, and location. When a given UEID, serving cell, and TA are known, then a corresponding location can be obtained. Location lookup 304 can therefore use the location lookup data structure 603 to obtain a live location 612 associated with a live serving cell and TA 611. The live location 612 is a location from the location lookup data structure 603 that is correlated with a serving cell and TA that substantially matches the live serving cell and TA 611.

Returning to FIG. 3, in an approach, individual UE historical call trace records (CTR) reported by eNodeBs and/or eNodeGs can be used as network information 311. For each UE, network equipment 300 can collect a network measurement pattern in the form of (serving cell, timing advance) and identify a frequently visiting place (FVP) pattern if the pattern is observed multiple times for the UE in the long history of network information 301. Each UE may have multiple FVPs with corresponding FVP patterns. Embodiments can aggregate the long history of network information 301 to pair with FVP patterns, in order to estimate FVP locations using an arc intersection process. A cross validation process can use paired-up measurements to improve the FVP location estimation accuracy. Each FVP pattern can be combined with calculated FVP location as a UE's FVP location lookup table.

Overall, techniques disclosed herein can build UE-level FVP lookup tables using historical UE measurement data and can estimate UE locations based on matching instantaneous network measurement patterns. The advantages of the disclosed techniques include, e.g., higher probability of observations with multiple serving cells. Using the aggregated call trace history of individual UEs increases the chance of producing reliable observations corresponding to multiple non co-located serving cells, for stationary UEs. This allows network equipment 300 to calculate the UE location using an arc intersection algorithm. When more than two distinct serving cells are observed, embodiments can run cross validation to pick a most reliable intersection as the FVP location estimate. Since UE to cell distances derived from TA information usually contain multipath effects, cross validation with multiple TA values observed for each serving cell in the history can effectively reduce the impact of noise on location estimation. Locations estimated with cross validation can outperform location estimates based on instant measurements with handovers. Methods can maximize the information extracted from the long history of a UE to help improve location estimation accuracy. This step can be conducted offline to save resources required for calculation. The term "offline" as used herein refers to operations that need not be performed in near real-time, and as such, can optionally have longer processing times and can process larger volumes of data.

Another advantage of the disclosed techniques is a low memory requirement for online geolocation. Once FVP lookup information is developed offline, a long history is no longer needed to geolocate a UE. For real-time estimation of the UE location, it is sufficient for the UE's instantaneous measurement (serving cell, timing advance) to match any of its FVP patterns, thus simplifying and speeding up the online geolocation process. Even stationary UEs, which are not at the cell-edge or in the middle of a handover event, can be accurately located using the methods disclosed herein. This decoupling of UE historical measurement data and online location estimation tackles the challenge of using history as a model input for geolocation, without sacrificing accuracy.

A further advantage of the disclosed techniques is a greater likelihood of successful location estimation. Since by definition, UEs visit their FVPs with high probability, this method enables equipment to estimate locations accurately with greater probability. Furthermore, accuracy variance is reduced. Since FVP lookup can be derived at UE or international mobile subscriber identity (IMSI) level, solutions can provide user-centric geo-tagging instead of a generic algorithm that targets the majority of the population and ignores specific individual behavior. Therefore, embodiments can improve accuracy variance.

Moreover, embodiments can be implemented without the use of training data. Embodiments can apply a deterministic calculation of arc intersection, which does not require collection of observed UE locations, as is needed for training ML-based algorithms. Therefore, there is no sample bias. Techniques disclosed herein can be applied to up to all UEs in a network without device over-representation bias. Embodiments need not miss possible UE locations for lack of training data.

Figure 7:
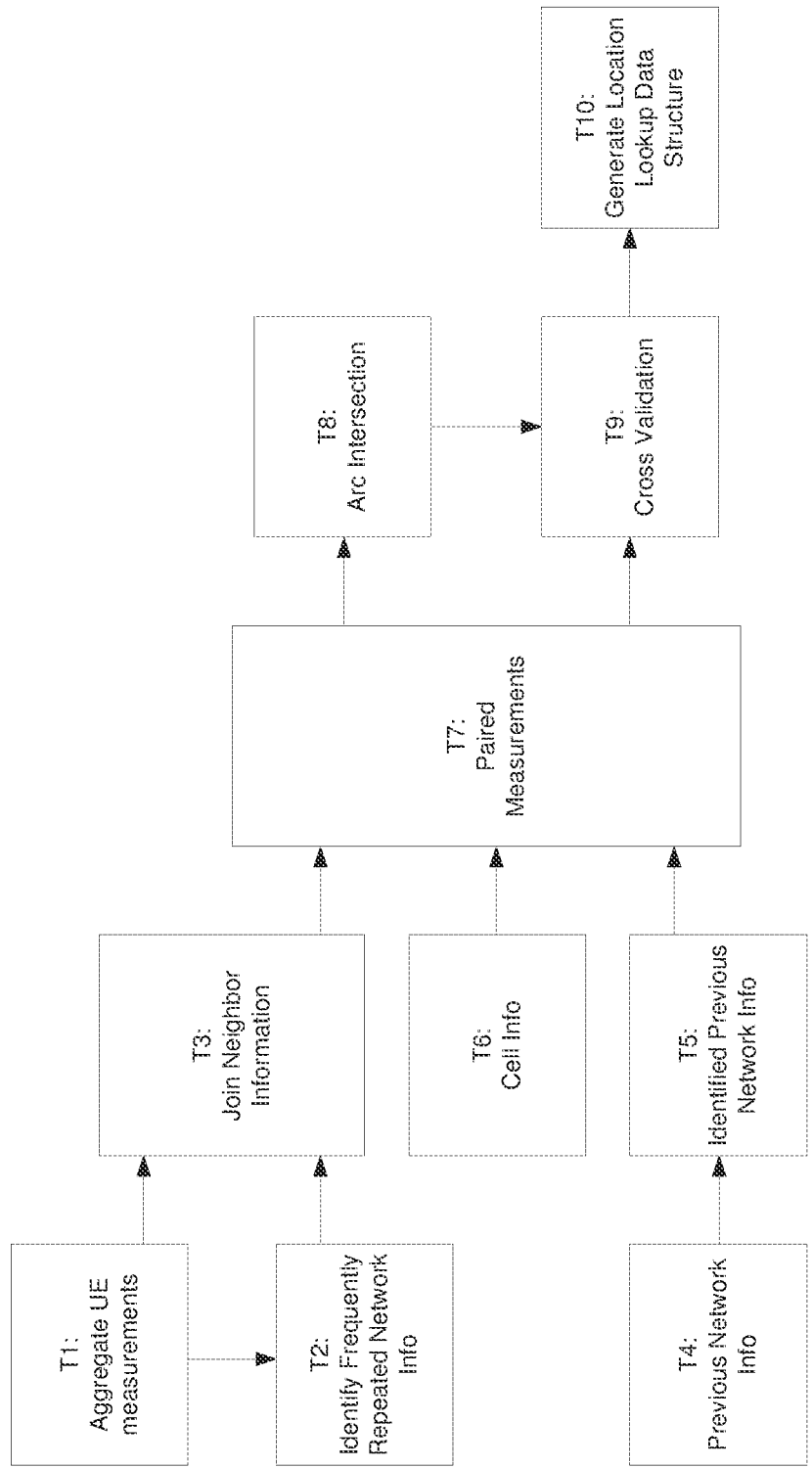
FIG. 7 is a flow diagram representing example offline processing operations, in accordance with various aspects and embodiments of the subject disclosure.

FIG. 7 is a flow diagram representing example offline processing operations, in accordance with various aspects and embodiments of the subject disclosure. FIG. 7 comprises operations that can be performed at example times T1, T2, T3, T4, T5, T6, T7, T8, T9, and T10. Results of operations can be provided as inputs to subsequent operations, as illustrated by the arrows in FIG. 7. The operations illustrated in FIG. 7 can be performed by network equipment, such as an offline processor 500 illustrated in FIG. 5, with the end result of generating a location lookup data structure at T10.

At T1, offline processor 500 can aggregate a UE's measurements in long time history (such as months) and derive (UE, cell, TA, obs_date_n, count). Here, obs_date_n can include the number of days a (UE, cell, TA) was observed, and count can include the number of records observed for the (UE, cell, TA). Cell could be a single cell or other cells co-located with this cell.

At T2, offline processor 500 can define the frequently visited FVP measurement patterns. An example definition is (UE, cell, TA) if obs_date>=3, count>=10. Meanwhile, offline processor 500 can add (UE, cell, TA-1), (UE, cell, TA-2) to FVP measurement patterns if observed in the UE history. This is because a TA value observed most frequently has a chance to be larger than the real UE to cell distance due to multipath effect. The effect could introduce 1-2 more units of TA reported than the true distance to cell.

At T3, offline processor 500 can join data of T1, T2 to get (UE, cell, TA, cell2, TA2) if cell and cell2 are neighbors (i.e., if cell2 is within the nearest n sites of cell, and cell2 and cell are not co-located).

At T4-T5, for each UE measurement in history, offline processor 500 can check its previous measurement within a time window t (t could be 1-2 mins). If the serving cell3 in previous measurement is not co-located with a current cell, offline processor 500 can form a handover measurement (UE, cell, TA, cell3, TA3).

At T6, offline processor 500 can obtain a cell information table: e.g., (cell, latitude, longitude, azimuth).

At T7, offline processor 500 can join the measurements of T3, T5 with cell info T6 to form a set of paired measurements: (UE, cell, cell_lat, cell_lon, cell azimuth, TA, cell neighbor, cell neighbor latitude, cell neighbor longitude, cell neighbor azimuth, TA neighbor).

At T8, offline processor 500 can run an arc intersection algorithm on each pair to generate a set of candidate FVP locations for each UE. The candidate locations can include, e.g., (UE, est_lat, est_lon).

At T9, offline processor 500 can perform cross validation and best match selection. For each pair of T7, offline processor 500 can split and generate (UE, cell*, cell*_lat, cell*_lon, cell azimuth, TA*), where cell* is cell or cell neighbor, and TA* is TA or TA neighbor.

Offline processor 500 can furthermore join candidate locations of T8 with (UE, est_lat, est_lon, cell*, cell*_lat, cell*_lon, cell*_azimuth, TA*) and compute the distance difference DD=abs(TA*-distance(cell*, estimated location)–delta)/78) and azimuth gap=abs(cell*_azimuth–azimuth(cell*, estimated location)), where delta is the TA correction used in in the arc intersection algorithm.

For each (UE, est_lat, est_lon), the offline processor 500 can count the good_n=number of (distinct location of cell* with DD_cell*<=2 and azimuth gap<=90) and MSE=mean (sqrt(sum DD^2)).

Offline processor 500 can join (UE, est_lat, est_lon, good_n, MSE) with (UE, est_lat, est_lon, cell*, TA*) to get (UE, cell*, TA*, est_lat, est_lon, good_n, MSE).

For (UE, cell*, TA*), offline processor 500 can sort by (good_n descending, MSE ascending) and keep the (est_lat, est_lon) ranked as first as the best match (UE, cell*, TA*, est_lat, est_lon). Offline processor 500 can remove the cases with good_n<3 to ensure the location is cross validated by three or more cells with distinct locations.

At T10, offline processor 500 can save (UE, cell*, TA*, est_lat, est_lon) from T9 as an FVP lookup database for subsequent online location lookups.

In some embodiments, FVP pattern extraction can be performed as follows. Model input data can include a long history of a UE's past network measurements comprising the following information: serving cell; timing advance (TA) indicative of the distance between UE and serving cell; and optionally, serving cell RSRP/RSRQ which measure signal strength/interference of serving cell. Cell information can comprise cell location; node information (co-located cells can be assigned the same node); and cell azimuth information.

Model input data and cell information can be combined to derive frequently observed serving nodes and corresponding TA values. Node to cell mapping can be used to derive an FVP measurement pattern for each UE, e.g., FVP Pattern=a set of (UE, cell, TA).

An example UE pattern matching algorithm can operate as follows. Given a set of FVP patterns and locations (estimated or known), an objective can be to check if a real-time observation matches any pattern from this set. This method can be extended to any mapping of (UE, Cell, TA) combinations to locations, and is not limited to the FVP lookup tables. Also, this illustration depicts the pattern matching process for TA, but can be extended to any other relevant pattern component.

First, denote a new real-time observation as follows: P_r=(UE_r, cell_r, TA_r). Select the subset of FVPs for this specific UE where the serving cell matches cell_r. If any element exists such that the TA exactly matches TA_r, then pick the corresponding FVP as the current UE location. If no such element exists, then pick the closest TA match, with an interval i, where i is determined based on prior analysis for the market or a larger region. Generically, this can be expressed as: P_r=>FVP_k=(UE_r, cell_r, TA_k), where TA_k solves: minimize: abs(TA_k-TA_r), wherein TA_k-i<=TA_r<=TA_k+i. If no FVP exists that satisfies the previous condition, then default to the basic algorithm for geolocation. In this illustration, error is minimized when the TA difference threshold is 3. So, we set i=3.

Figure 8:
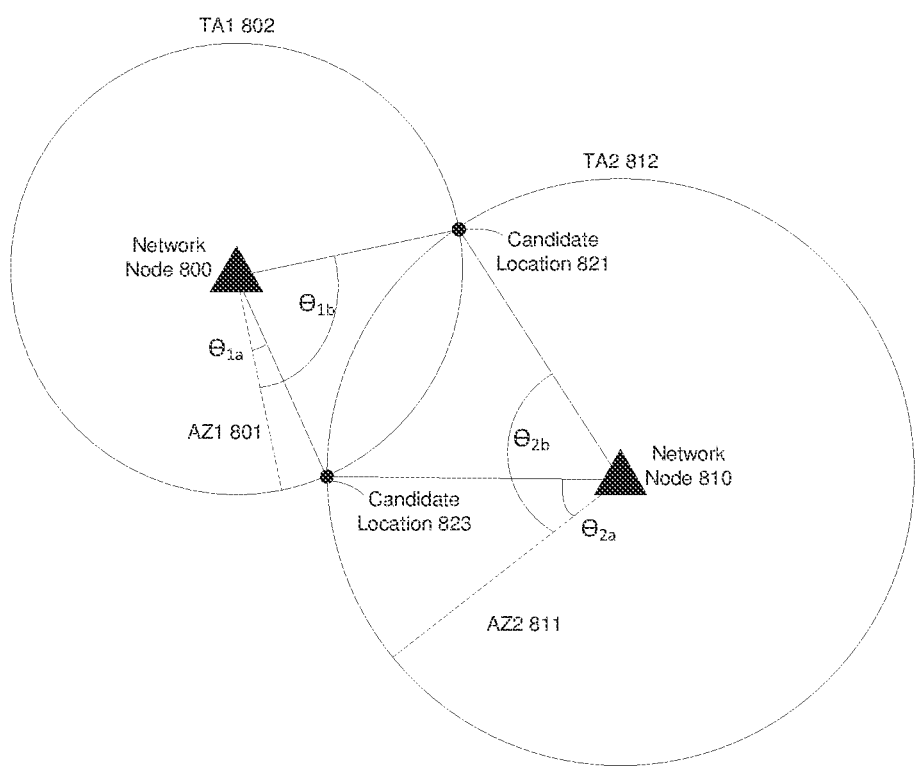
FIG. 8 is a diagram that illustrates arc intersection processing to determine locations of frequently visited places with enhanced accuracy, in accordance with various aspects and embodiments of the subject disclosure.

FIG. 8 is a diagram that illustrates arc intersection processing to determine locations of frequently visited places with enhanced accuracy, in accordance with various aspects and embodiments of the subject disclosure. FIG. 8 illustrates a network node 800 and a network node 810. A timing advance TA1 802 is observed for a UE when the UE is connected to a serving cell at network node 800, and a timing advance TA2 812 is observed for the UE when the UE is connected to a serving cell at network node 810. TA1 802 defines first circle (arc) of possible locations, TA2 812 defines second circle (arc) of possible locations. The intersections of these arcs are candidate locations 821, 823 of the UE, if the UE is presumed to be at a same location when connected to either of the network nodes 800, 810.

In FIG. 8, an angle $\theta_{1b}$ is defined by network node 800 and candidate locations 821, 823. An angle $\theta_{1a}$ is the angle between an azimuth AZ1 801 of the serving cell at network node 800, and the line between network node 800 and candidate location 823. An angle $\theta_{2b}$ is defined by network node 810 and candidate locations 821, 823. An angle 82a is the angle between an azimuth AZ2 811 of the serving cell at network node 810, and the line between network node 810 and candidate location 823. In the illustrated example, AZ1 801 is 135 degrees, and AZ2 811 is 225 degrees.

In an example candidate location selection, the candidate location with the smaller average angle difference $(\theta_1+\theta_2)/2$ can be selected. Therefore in the example provided by FIG. 8, candidate location 823 can be selected as the location of the UE, because $(\theta_{1a}+\theta_{2a})/2$ is smaller than $(\theta_{1b}+\theta_{2b})/2$.

In general, given paired measurements: (cell, azimuth, TA, cell neighbor, azimuth neighbor, TA neighbor), and arc intersection algorithm can be performed on each pair. In the arc intersection algorithm, a circle_A can be defined using a cell location as the center and TA converted distance as the radius, and a circle_B can be defined using a cell neighbor location as the center and TA neighbor converted distance as the radius. The TA to radius conversion formula can comprise, e.g., radius=(raw TA/16-delta)*78. The delta can be used to correct the rounding effects in TA reports. An example delta can be 0.5.

Next, the intersections of circle_A and circle_B can be computed. If there exist two intersections (sol1, sol2), then each sol can be lined up with the centers of two circles (i.e. cell locations) and the angle between the line and cell azimuths can be calculated. The intersection with smaller angles can be selected as the arc intersection solution. If there exists only one intersection between the circles, then the one intersection can be used as the arc intersection solution.

Next, cross validation can be performed by selecting the most reliable arc intersection solution if (cell, TA) has multiple paired measurements. This can be done, e.g., by picking the intersection corresponding to the minimal TA to cell neighbor, or by picking the intersection with the minimal mean squared of (TA—Distance) to each cell neighbor.

Figure 9:
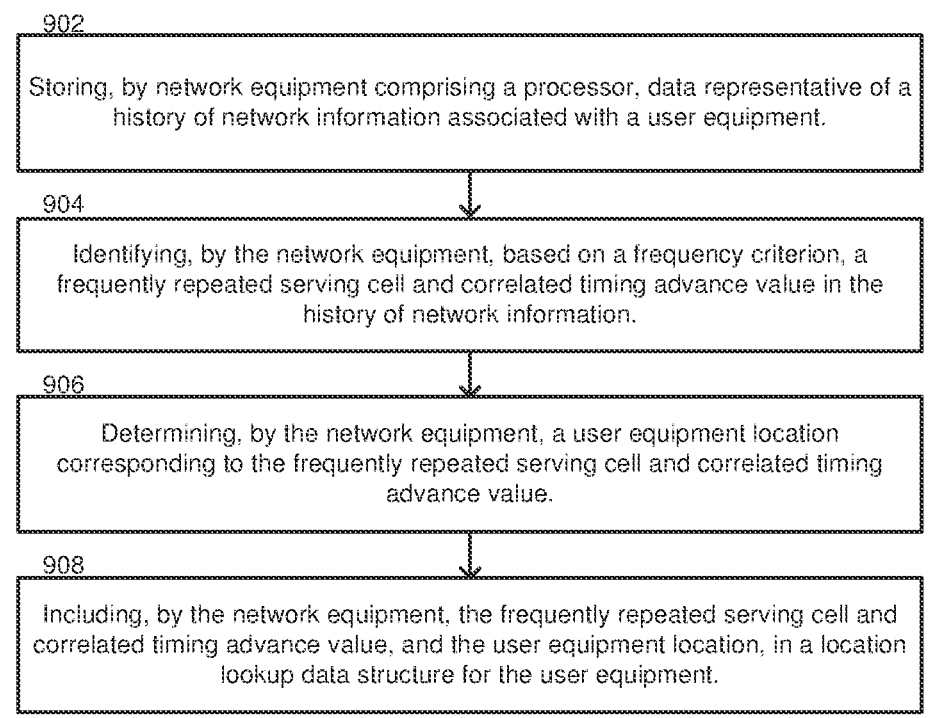
FIG. 9 is a flow diagram representing example operations of network equipment in connection with offline processing to generate a location lookup data structure, in accordance with various aspects and embodiments of the subject disclosure.

FIG. 9 is a flow diagram representing example operations of network equipment in connection with offline processing to generate a location lookup data structure, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment 300 such as illustrated in FIG. 3. Example operation 902 comprises storing, by network equipment 300 comprising a processor, data representative of a history of network information associated with a user equipment. For example, network equipment 300 can store network information 311 in long history of network information 301. The history of network information can comprise correlated serving cell and timing advance information, e.g., identifications of serving cells that served the user equipment during the history, and correlated timing advance values indicating timing advances while the user equipment was served by the serving cells, as described in connection with FIG. 2. The history of network information can comprise, e.g., at least a one month history.

Example operation 904 comprises identifying, by the network equipment 300, based on a frequency criterion, a frequently repeated serving cell and correlated timing advance value in the history of network information. In some embodiments, the frequency criterion can comprise a number of days and a total count. The frequently repeated serving cell and correlated timing advance value can be identified, e.g., by offline processor 302, via occurrence within the long history of network information 301 on a number of different days that is at least the number of days, and via a total number of occurrences that is at least the total count.

Example operation 906 comprises determining, by the network equipment 300, a user equipment location corresponding to the frequently repeated serving cell and correlated timing advance value, wherein determining the user equipment location is based on a location of a network node associated with the frequently repeated serving cell and the correlated timing advance value.

For example, offline processor 302 can determine a location of an FVP based at least on a network node location, and optionally, using additional location determination techniques. In some embodiments, determining the user equipment location can be further based on an azimuth associated with the frequently repeated serving cell. In some embodiments, determining the user equipment location can be further based on a secondary location of a secondary network node associated with a neighbor cell of the frequently repeated serving cell and a secondary correlated timing advance value indicating a timing advance while the user equipment was served by the neighbor cell. In some embodiments, determining the user equipment location can comprise using arc intersection to determine candidate user equipment locations, and optionally performing cross validation to select the user equipment location from among the candidate user equipment locations.

Example operation 908 comprises including, by the network equipment 300, the frequently repeated serving cell and correlated timing advance value, and the user equipment location, in a location lookup data structure 303 for the user equipment. The location lookup data structure 303 can subsequently be used to efficiently identify user equipment location when the user equipment returns to an FVP identified in the location lookup data structure 303.

Figure 10:
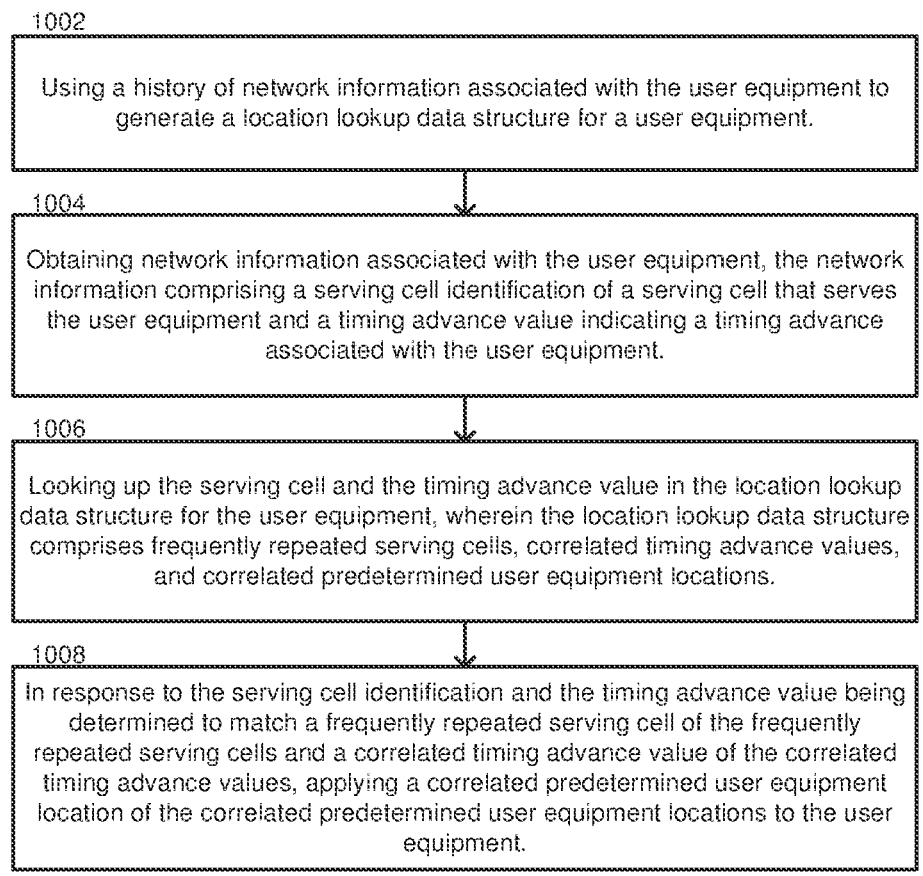
FIG. 10 is a flow diagram representing example operations of network equipment in connection with live location of a user equipment using a location lookup data structure, in accordance with various aspects and embodiments of the subject disclosure.

FIG. 10 is a flow diagram representing example operations of network equipment in connection with live location of a user equipment using a location lookup data structure, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by network equipment 300 such as illustrated in FIG. 3. Example operation 1002 comprises using a history of network information associated with the user equipment, such as the long history of network information 301, to generate the location lookup data structure 303 for a user equipment.

Generating the location lookup data structure 303 can comprise operations included in FIG. 9, e.g., identifying, based on a frequency criterion, the frequently repeated serving cells and correlated timing advance values in the history of network information, and determining the correlated predetermined user equipment locations based on locations of network nodes associated with the frequently repeated serving cells. In some embodiments, determining the correlated predetermined user equipment locations can be further based on secondary locations of secondary network nodes, wherein the secondary network nodes are associated with neighbor cells of the frequently repeated serving cells. In some embodiments, determining the correlated predetermined user equipment locations can comprise applying arc intersection using arcs centered on the locations of the network nodes and the secondary locations of the secondary network nodes, as can be understood with reference to FIG. 8.

Example operation 1004 comprises obtaining, e.g., by location lookup 304, network information 311 associated with the user equipment, the network information 311 comprising a serving cell identification of a serving cell that serves the user equipment and a timing advance value indicating a timing advance associated with the user equipment.

Example operation 1006 comprises looking up, e.g., by location lookup 304, the serving cell and the timing advance value in a location lookup data structure 303 for the user equipment, wherein the location lookup data structure 303 comprises frequently repeated serving cells, correlated timing advance values, and correlated predetermined user equipment locations.

Example operation 1008 comprises, in response to the serving cell identification and the timing advance value (in network information 311) being determined to match a frequently repeated serving cell of the frequently repeated serving cells and a correlated timing advance value of the correlated timing advance values (in the location lookup data structure 303), applying a correlated predetermined user equipment location of the correlated predetermined user equipment locations (from the location lookup data structure 303) to the user equipment. The timing advance value in network information 311 can be determined to match the correlated timing advance value from the location lookup data structure 303 when the timing advance value in network information 311 is within a range of timing advance values comprising the correlated timing advance value, in order to reduce an effect of timing advance measurement noise.

Figure 11:
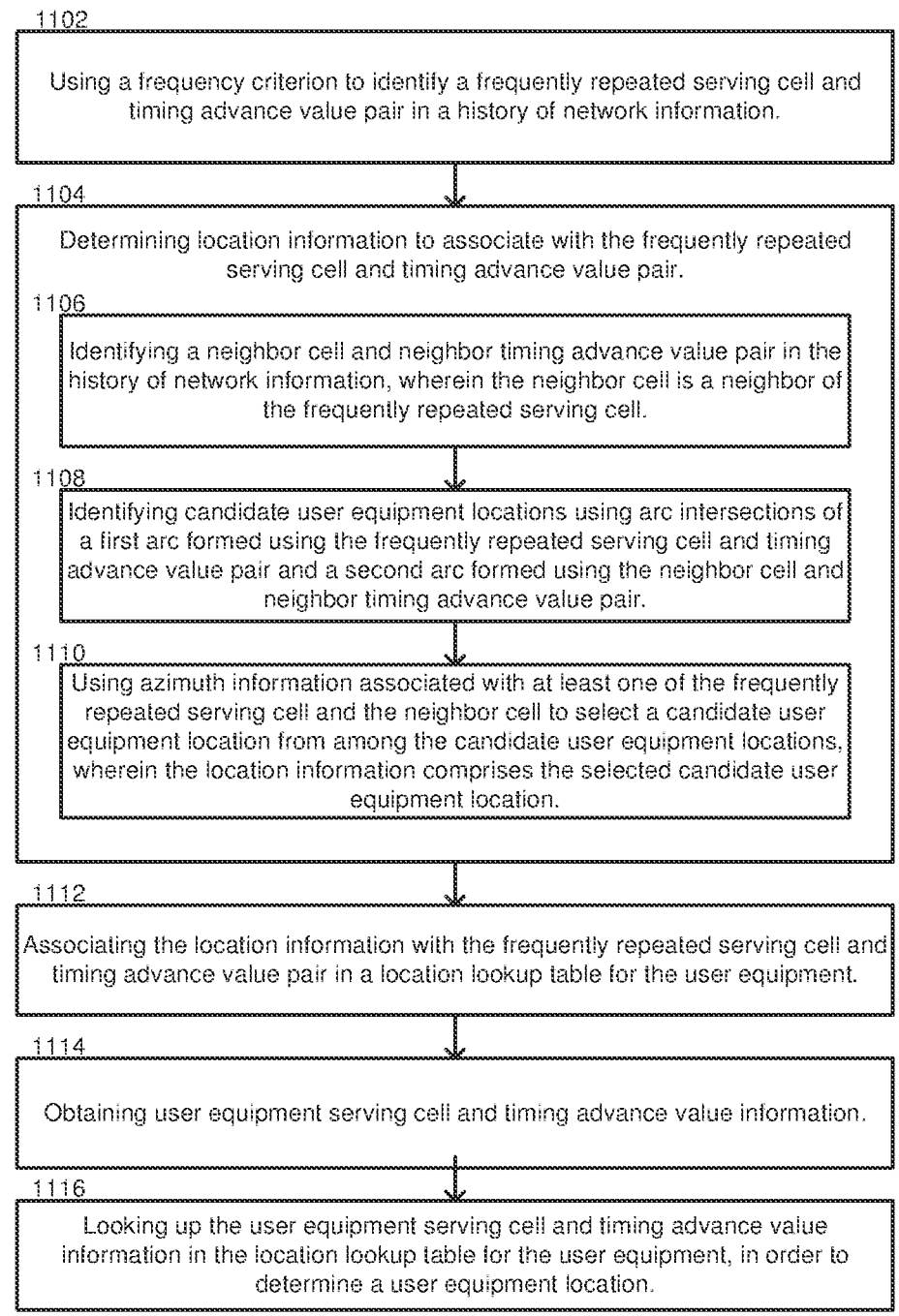
FIG. 11 is a flow diagram representing example operations of network equipment in connection with determining locations of frequently visited places with enhanced accuracy based on a long history of network information, in accordance with various aspects and embodiments of the subject disclosure.

FIG. 11 is a flow diagram representing example operations of network equipment in connection with determining locations of frequently visited places with enhanced accuracy based on a long history of network information, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 11 can be performed, for example, by network equipment 300 such as illustrated in FIG. 3, comprising an offline processor 302 such as the offline processor 500 illustrated in FIG. 5. Example operation 1102 comprises using, e.g., by FVP identifier 501, a frequency criterion to identify a frequently repeated serving cell and timing advance value pair in a history of network information, e.g., in long history of network information 301. The frequently repeated serving cell and timing advance value pair can comprise, e.g. a serving cell at network node 201 and timing advance value TA231, illustrated in FIG. 2, which are correlated to an FVP 211 of a user equipment.

Example operation 1104 comprises determining location information to associate with the frequently repeated serving cell and timing advance value pair, wherein the frequently repeated serving cell and timing advance value pair is frequently repeated, based on the frequency criterion, in the history of network information 301 associated with a user equipment. Determining the location information can comprise operations 1106-1110. The location information can comprise, e.g., latitude and longitude information, or other coordinate information as may be appropriate for particular embodiments.

Example operation 1106 comprises identifying a neighbor cell and neighbor timing advance value pair in the history of network information 301, wherein the neighbor cell is a neighbor of the frequently repeated serving cell. For example, the neighbor cell can be a cell at network node 202 and the neighbor timing advance value can be TA 232, illustrated in FIG. 2.

Example operation 1108 comprises identifying candidate user equipment locations using arc intersections of a first arc formed using the frequently repeated serving cell and timing advance value pair and a second arc formed using the neighbor cell and neighbor timing advance value pair. For example, with reference to FIG. 8, if the network node 800 is considered to be the network node 201 from FIG. 2, and the network node 810 is considered to be the network node 202 from FIG. 2, then candidate locations 821, 823 can be determined by arc intersection.

Example operation 1110 comprises using azimuth information associated with at least one of the frequently repeated serving cell and the neighbor cell, e.g., AZ1 801 and AZ2 811, to select a candidate user equipment location 823 from among the candidate user equipment locations 821, 823, wherein the location information determined by operation 1104 comprises the selected candidate user equipment location 823.

Example operation 1112 comprises associating the location information, determined at operation 1104, with the frequently repeated serving cell and timing advance value pair, determined at operation 1102, in a location lookup table for the user equipment, e.g., in location lookup data structure 303.

Example operations 1114 and 1116 are directed to subsequent use of the location lookup table generated according to operations 1102-1112. Example operation 1114 comprises obtaining user equipment serving cell and timing advance value information, e.g. obtaining network information 311 by location lookup 304. Example operation 1116 comprises looking up, e.g., by location lookup 304, the user equipment serving cell and timing advance value information in the location lookup table 303 for the user equipment, in order to determine a user equipment location. Location lookup 304 can optionally provide the user equipment location to near real-time UE locator 305 for subsequent processing as may be appropriate for particular embodiments.

Figure 12:
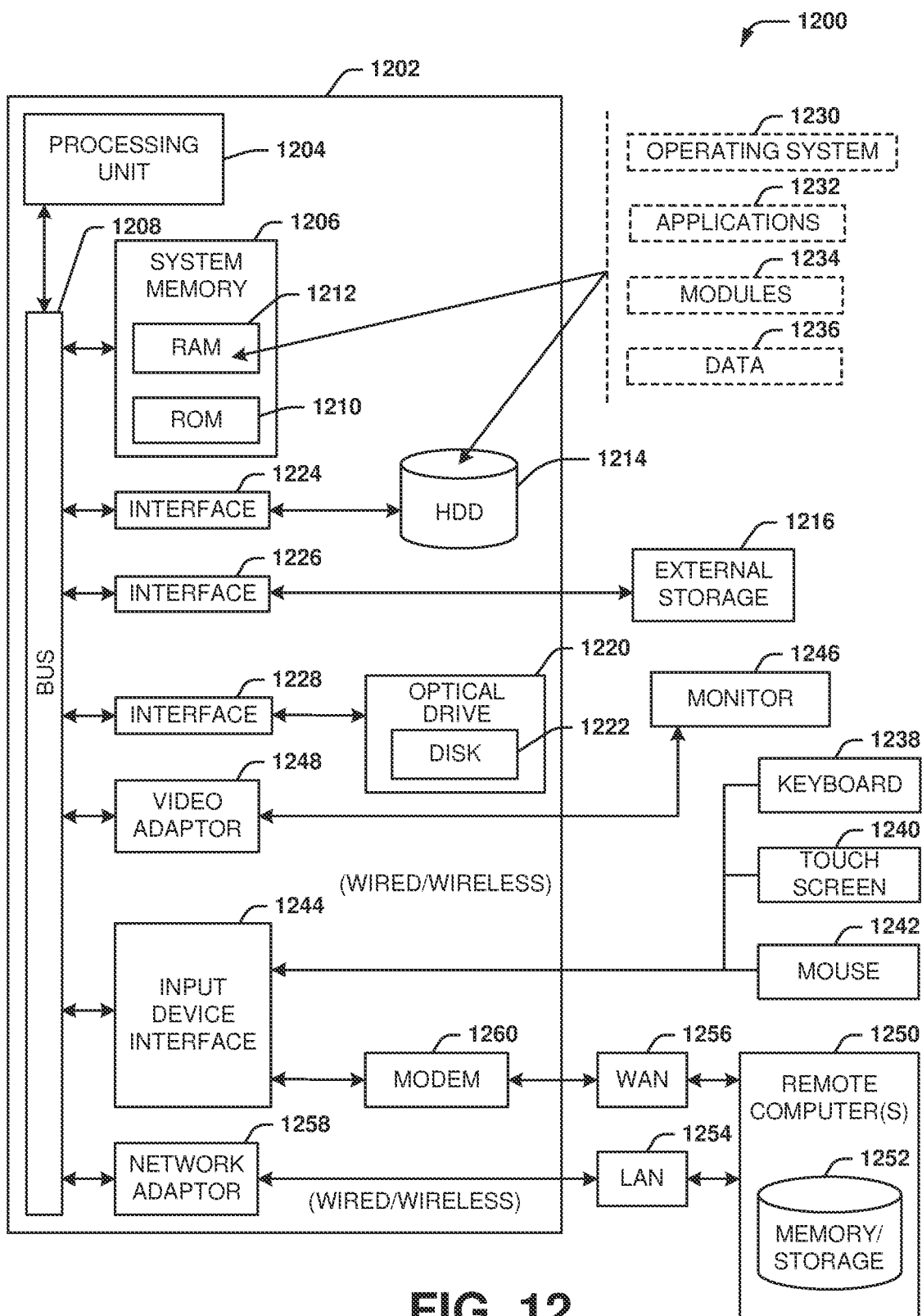
FIG. 12 is a block diagram of an example computer that can be operable to execute processes and methods in accordance with various aspects and embodiments of the subject disclosure.

FIG. 12 is a block diagram of an example computer that can be operable to execute processes and methods in accordance with various aspects and embodiments of the subject disclosure. The example computer can be adapted to implement, for example, any of the various network equipment described herein.

FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.).

While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    storing, by network equipment comprising a processor, data representative of a history of network information associated with a user equipment,
    wherein the history of network information comprises correlated serving cell and timing advance information,
    wherein the correlated serving cell and timing advance information comprises identifications of serving cells that served the user equipment during the history, and correlated timing advance values indicating timing advances while the user equipment was served by the serving cells;
    identifying, by the network equipment, based on a frequency criterion, a frequently repeated serving cell and correlated timing advance value in the history of network information, wherein the frequently repeated serving cell and correlated timing advance value is correlated with a frequently visited location of the user equipment, wherein the frequency criterion defines a frequency needed to qualify as a frequently repeated serving cell;
    determining, by the network equipment, a user equipment location corresponding to the frequently repeated serving cell and correlated timing advance value, wherein determining the user equipment location is based on a location of a network node associated with the frequently repeated serving cell and the correlated timing advance value, and wherein the determining the user equipment location comprises identifying a neighboring cell adjacent to the frequently repeated serving cell and correlated secondary timing advance information associated with the neighboring cell while the neighboring cell was serving the user equipment, and determining the user equipment location based on the timing advance information and the correlated secondary timing advance information to reduce impact of timing advance measurement noise on location estimation; and
    including, by the network equipment, the frequently repeated serving cell and correlated timing advance value, and the user equipment location, in a location lookup data structure for the user equipment.

2. The method of claim 1, wherein the history of network information comprises at least a one month history.

3. The method of claim 1, wherein the frequency criterion comprises a number of days and a total count, and wherein the frequently repeated serving cell and correlated timing advance value is identified via occurrence on a number of different days that is at least the number of days and via a total number of occurrences that is at least the total count.

4. The method of claim 1, wherein determining the user equipment location is further based on an azimuth associated with the frequently repeated serving cell.

5. The method of claim 1, wherein determining the user equipment location is further based on a secondary location of a secondary network node associated with a neighbor cell of the frequently repeated serving cell and a secondary correlated timing advance value indicating a timing advance while the user equipment was served by the neighbor cell.

6. The method of claim 5, wherein determining the user equipment location comprises using arc intersection to determine candidate user equipment locations.

7. The method of claim 6, wherein determining the user equipment location comprises performing cross validation to select the user equipment location from among the candidate user equipment locations.

8. Network equipment, comprising:
    a processor; and
    a memory that stores executable instructions that, when executed by the processor, facilitate performance of operations, comprising:
        obtaining network information associated with a user equipment, the network information comprising a serving cell identification of a serving cell that serves the user equipment and a timing advance value indicating a timing advance associated with the user equipment;
        looking up the serving cell and the timing advance value in a location lookup data structure for the user equipment, wherein the location lookup data structure comprises frequently repeated serving cells, correlated timing advance values, and correlated predetermined user equipment locations, wherein the frequently repeated serving cells correspond to frequently-visited locations of the user equipment, wherein a predetermined frequency criterion defines a frequency needed to qualify as a frequently repeated serving cell, wherein the location lookup data structure for the user equipment further comprises information about a secondary location of secondary network node associated with a neighboring cell adjacent to a frequently repeated serving cell of the frequently repeated serving cells and a secondary correlated timing advance value associated with the neighboring cell while the user equipment was served by the neighboring cell; and
        in response to the serving cell identification and the timing advance value being determined to match a frequently repeated serving cell of the frequently repeated serving cells and a correlated timing advance value of the correlated timing advance values, applying a correlated predetermined user equipment location of the correlated predetermined user equipment locations to the user equipment.

9. The network equipment of claim 8, wherein the timing advance value is determined to match the correlated timing advance value when the timing advance value is within a range of timing advance values comprising the correlated timing advance value, in order to reduce an effect of timing advance measurement noise.

10. The network equipment of claim 8, wherein the operations further comprise using a history of network information associated with the user equipment to generate the location lookup data structure.

11. The network equipment of claim 10, wherein generating the location lookup data structure comprises:
   identifying, based on the predetermined frequency criterion, the frequently repeated serving cells and correlated timing advance values in the history of network information; and
   determining the correlated predetermined user equipment locations based on locations of network nodes associated with the frequently repeated serving cells.

12. The network equipment of claim 11, wherein determining the correlated predetermined user equipment locations is further based on secondary locations of secondary network nodes, and wherein the secondary network nodes are associated with neighbor cells of the frequently repeated serving cells.

13. The network equipment of claim 12, wherein determining the correlated predetermined user equipment locations comprises applying arc intersection using arcs centered on the locations of the network nodes and the secondary locations of the secondary network nodes.

14. The network equipment of claim 11, wherein the frequency criterion comprises a number of days and a total count.

15. A non-transitory machine-readable medium, comprising executable instructions that, when executed by a processor, facilitate performance of operations, comprising:
   determining location information to associate with a frequently repeated serving cell and timing advance value pair,
   wherein the frequently repeated serving cell and timing advance value pair is frequently repeated, based on a frequency criterion, in a history of network information associated with a user equipment, wherein the frequency criterion is selected to define a frequency of visitation needed to qualify as a frequently repeated serving cell, and
   wherein determining the location information comprises:
   identifying a neighbor cell and neighbor timing advance value pair in the history of network information, wherein the neighbor cell is a neighbor of the frequently repeated serving cell;
   identifying candidate user equipment locations using arc intersections of a first arc formed using the frequently repeated serving cell and timing advance value pair and a second arc formed using the neighbor cell and neighbor timing advance value pair; and
   using azimuth information associated with at least one of the frequently repeated serving cell and the neighbor cell to select a candidate user equipment location from among the candidate user equipment locations, wherein the location information comprises the selected candidate user equipment location;
   determining secondary location information to associate with the frequently repeated serving cell, wherein the secondary location information is based on a secondary location of a secondary access node associated with a neighboring cell of the frequently repeated serving cell and secondary correlated timing advance information indicating a timing advance while the user equipment was served by the neighboring cell; and
   associating the location information and the secondary location information with the frequently repeated serving cell and timing advance value pair in a location lookup table for the user equipment.

16. The non-transitory machine-readable medium of claim 15, wherein the operations further comprise using the frequency criterion to identify the frequently repeated serving cell and timing advance value pair in the history of network information.

17. The non-transitory machine-readable medium of claim 15, wherein the frequency criterion comprises a number of days and a total count.

18. The non-transitory machine-readable medium of claim 15, wherein the history of network information comprises at least a one month history.

19. The non-transitory machine-readable medium of claim 15, wherein the location information comprises latitude and longitude information.

20. The non-transitory machine-readable medium of claim 15, wherein the operations further comprise:
   obtaining user equipment serving cell and timing advance value information; and
   looking up the user equipment serving cell and timing advance value information in the location lookup table for the user equipment, in order to determine a user equipment location.

* * * * *